United States Patent [19]

Roberts et al.

[11] Patent Number: 4,622,048
[45] Date of Patent: Nov. 11, 1986

[54] LIQUID-GAS SEPARATOR

[75] Inventors: John H. Roberts, La Crosse, Wis.; James C. Tischer, La Crescent, Minn.

[73] Assignee: American Standard Inc., New York, N.Y.

[21] Appl. No.: 692,096

[22] Filed: Jan. 17, 1985

[51] Int. Cl.⁴ ............................................. B01D 53/24
[52] U.S. Cl. ...................................... 55/199; 55/452; 55/457; 55/459 R
[58] Field of Search ................. 55/199, 452, 201–204, 55/456, 457, 458, 459 R, DIG. 17

[56] References Cited
U.S. PATENT DOCUMENTS

| | | | |
|---|---|---|---|
| 338,772 | 3/1886 | Polte | 55/457 |
| 1,360,349 | 11/1920 | Wright | 55/457 |
| 3,151,961 | 10/1964 | Blackmore et al. | 55/205 |
| 3,161,490 | 12/1964 | Dudek | 55/205 |
| 3,336,732 | 8/1967 | Carroll | 55/201 |
| 3,641,745 | 2/1972 | Moore | 55/457 X |
| 3,778,984 | 12/1973 | Lawser | 55/333 |
| 3,915,679 | 10/1975 | Roach et al. | 55/457 X |
| 3,917,474 | 11/1975 | Heckenkamp et al. | 55/332 |
| 4,070,168 | 1/1978 | Beattie | 55/457 X |
| 4,142,380 | 3/1979 | Dyhr et al. | 62/471 |
| 4,187,089 | 2/1980 | Hodgson | 55/457 X |
| 4,255,099 | 3/1981 | Komori | 418/97 |

Primary Examiner—Charles Hart
Attorney, Agent, or Firm—Ronald M. Anderson; Carl M. Lewis; William J. Beres

[57] ABSTRACT

Apparatus for separating a liquid from a gas includes a cylindrical separator element disposed in a sealed housing. The separator element includes a helical ramp wrapped around a cylindrical column both of which are disposed in a hollow cylindrical shell. The ramp, column and shell cooperate to define a helical passage through which a liquid-gas mixture is constrained to pass between an inlet and outlet at opposing ends of the separator element. A liquid-gas mixture entering the separator element is imparted a swirling motion as it passes through the helical passage within the separator element. Liquid entrained in the mixture migrates radially outward within the separator element and passes through the permeable shell. The separated liquid drains by force of gravity to a sump area defined by the sealed housing from where it can be drained for re-use.

4 Claims, 12 Drawing Figures

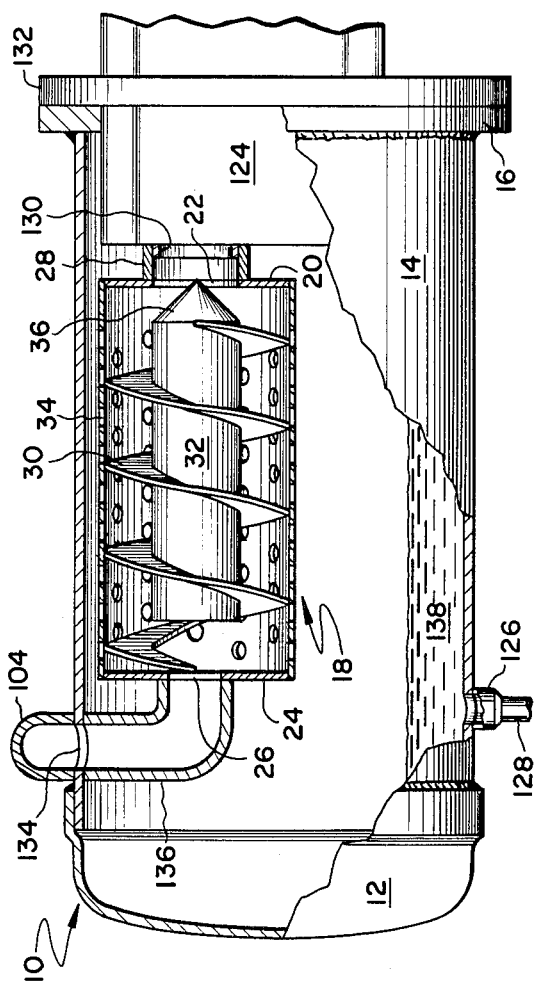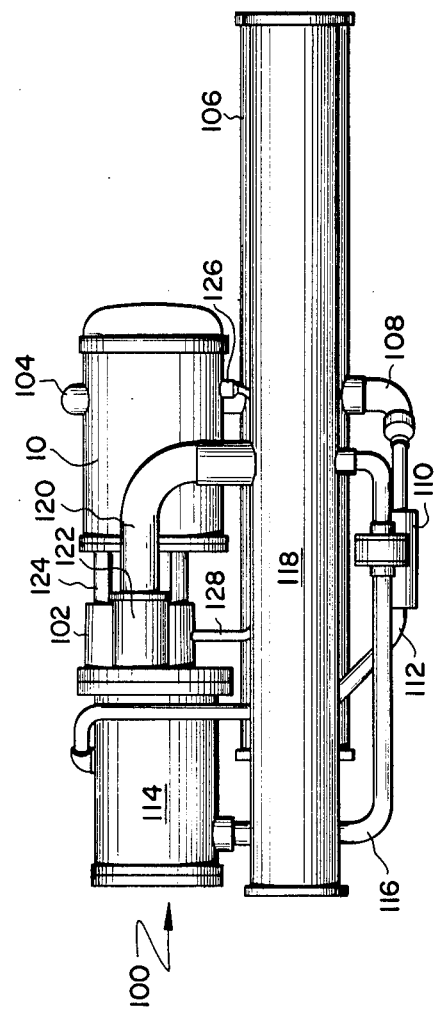

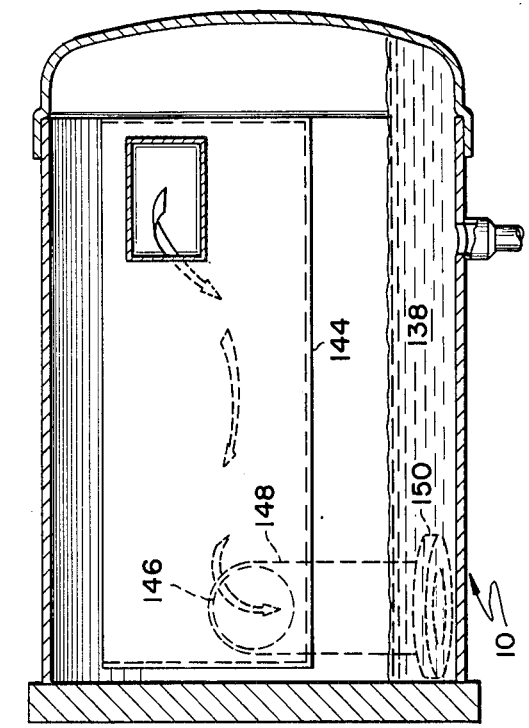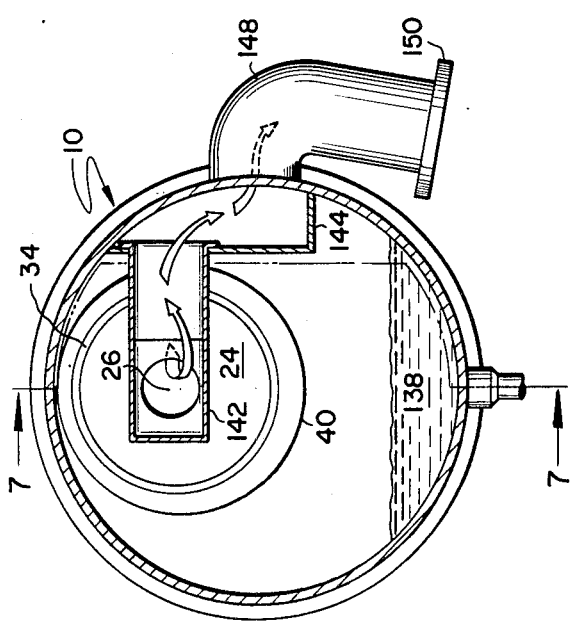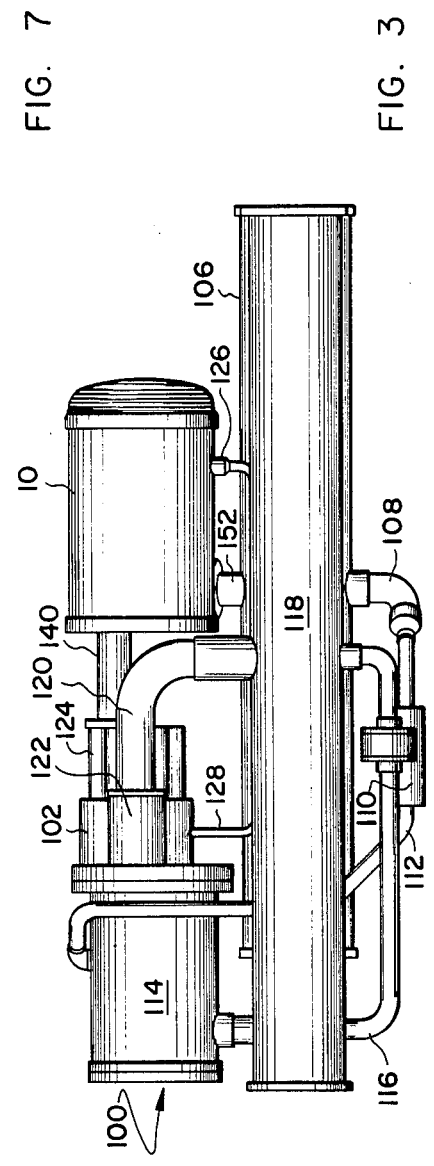

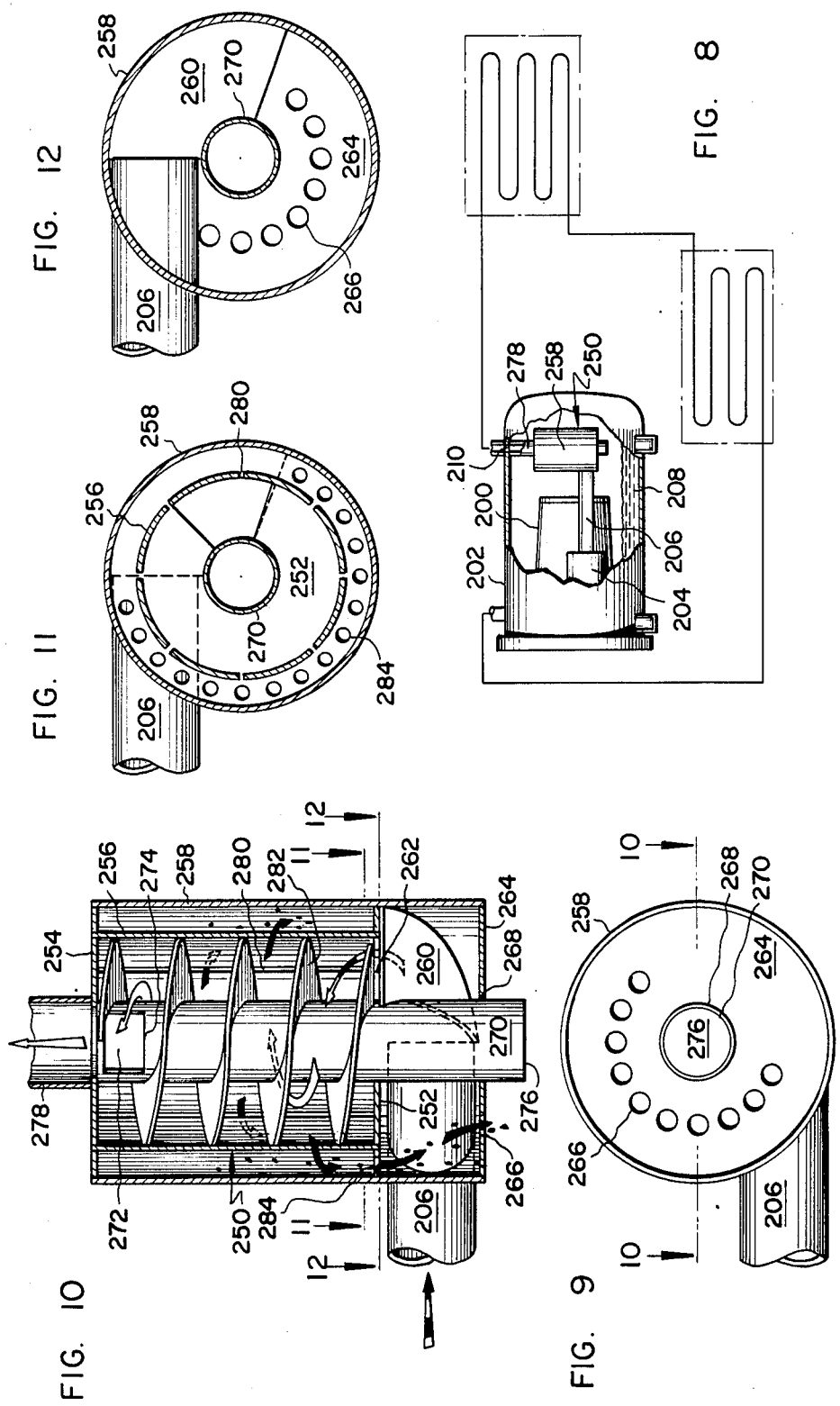

LIQUID-GAS SEPARATOR

BACKGROUND ART

The present invention relates generally to the art of compressing a gas. More particularly, the present invention relates to the compression of a refrigerant gas. Further, the present invention relates to the compression of a refrigerant gas into which a liquid is injected during the compression process. With still more particularlity, the invention relates to the requirement to separate entrained injected oil from the oil-gas mixture discharged by a compressor in a refrigeration circuit. Finally, the invention relates to apparatus for centrifugally separating entrained oil from the mixture of compressed refrigerant gas and atomized oil discharged from a screw compressor in a refrigeration circuit.

Compressors are used in refrigeration circuits to raise the pressure of a refrigerant gas from a suction to a discharge pressure which permits the refrigerant to be used within the circuit to cool a desired medium. Many types of compressors, including rotary screw compressors, are commonly employed to compress the refrigerant gas in a refrigeration circuit. Two complementary rotors, a male and a female, are located in the screw compressor housing. The screw compressor housing has a low pressure end which includes a suction port and a high pressure end which includes a discharge port. Refrigerant gas at suction pressure enters the low pressure end of the compressor housing and is there enveloped in a pocket formed between the turning complementary rotors. The volume of the gas pocket decreases and the pocket is circumferentially displaced as the compressor rotors continue to rotate and mesh. The gas within such a pocket is compressed, and therefore heated, by virtue of the decreasing volume in which it is contained prior to the pocket's opening to the discharge port. The pocket, as it continues to decrease in volume, eventually opens to the discharge port in the high pressure end of the compressor housing and the compressed gas is discharged from the compressor.

Screw compressors used in refrigeration applications will, in the large majority of instances, include an oil injection feature. Oil is injected into the working chamber of the compressor, and therefore into the refrigerant gas being compressed therein for several reasons. First, the injected oil acts to cool the refrigerant gas undergoing compression. As a result, the compressor rotors are cooled allowing for tighter tolerances between the rotors. Second, the oil acts as a lubricant. One of the two rotors in a screw compressor is normally driven by an external source, such as an electric motor, with the other rotor being driven by virtue of its meshing relationship with the externally driven rotor. The injected oil prevents excessive wear between the driving and driven rotors. Finally, oil injected into the working chamber of a screw compressor acts as a sealant between the meshing rotors and between the rotors and the working chamber in which they are contained in the compressor housing. Oil injection therefore increases the efficiency and prolongs the life of a screw compressor.

Oil injected into the working chamber of a screw compressor is atomized and becomes entrained in the refrigerant gas undergoing compression. Such oil, to a great extent, must be removed from the oil-rich mixture discharged from the compressor in order to make the oil available for reinjection into the compressor for the purposes enumerated above. Further, removal of excess injected oil must be accomplished to ensure that the performance of the refrigerant gas is not unduly affected within the refrigeration circuit.

Screw compressors have proven to be particularly suited for use in large capacity refrigeration systems with application in 40 to 400-ton systems being common. The size of such compressors and the amount of oil injected thereinto is significant. Injection of one part oil for every five parts of circulated refrigerant by weight coupled with a requirement to remove 90% or more of the injected oil immediately upon discharge of the mixture from the compressor is typical.

Liquid-gas separators have historically comprised large separator receiver combinations which have included, in many instances, baffle schemes to facilitate liquid-gas separation. Such separator apparatus, as indicated in U.S. Pat. No. 3,917,474 to Heckenkamp et al, are neither simple nor inexpensive to fabricate. Further, many such units call for the separator element to be removable in order to allow for its cleaning or replacement. There exist many applications and environments in which the compressor installation is not readily accessible or in which opening of the compressor apparatus to the environment is undesirable. In such cases the refrigeration equipment, including the liquid separator apparatus, is preferably hermetically or semi-hermetically sealed. Provision must therefore be made for liquid separator apparatus which is highly reliable yet which does not require regularly scheduled maintainence or provision for regular access into the interior of the compressor/separator installation.

A more simple, easily fabricated and inexpensive, yet highly reliable and efficient liquid-gas separator is required which removes a predetermined amount of oil from the oil gas mixture discharged by a screw compressor in a refrigeration application.

SUMMARY OF THE INVENTION

It will be appreciated that it is an object of this invention to separate an entrained liquid, such as oil, from a received liquid-gas mixture.

It is another object of this invention to separate a liquid from a gas using apparatus employing no moving parts.

It is still another object of this invention to remove a predetermined amount of liquid from a received liquid-gas mixture using the centrifugal force generated by constraining the received mixture to travel along a helical path.

Finally, it is an object of the present invention to provide easily fabricated and relatively inexpensive apparatus for efficiently recovering entrained oil from the mixture discharged by a rotary screw compressor in a refrigeration application.

The liquid-gas separator of our invention includes a hermetically sealed housing in which a separator element is disposed. The separator element includes a cylindrical shell and defines an inlet and an outlet disposed generally at opposite ends of the separator shell. The inlet of the separator element is in direct flow communication with the discharge port of the compressor in a refrigeration circuit and the separator element therefore directly receives the liquid-gas mixture discharged by the compressor. The outlet of the separator element is in flow communication with a discharge opening in the hermetically sealed housing in which the separator element is disposed. Gas from which liquid has been separated passes out of the separator element outlet and thence out of the sealed housing. The shell of the separator element is liquid permeable and forms the cylindrical wall of the separator element. In the preferred embodiment the separator shell defines a plurality of apertures of a predetermined size and shape through which liquid separated from the liquid-gas mixture received by the separator element passes. The separator element includes, in addition to the shell, a helical ramp disposed around a central column both of which are mounted axially within the separator shell. A helical passage is therefore formed within the separator element through which a received liquid-gas mixture is constrained to pass between the separator element inlet and outlet. This passage is defined by the interior of the permeable separator shell, the helical ramp, and the central column about which the helical ramp winds. Liquid separated from the mixture as a result of the swirling motion imparted to the mixture within the separator element passes through the permeable shell and drains to a sump area within the sealed housing. Provision is made for draining the liquid which settles in the sump area of the sealed housing so that the liquid can be returned to the compressor and reinjected thereinto.

The separator element may optionally be enclosed in a second housing within the sealed housing. This second housing contains apertures in its lowermost portion and facilitates the establishment of a predetermined pressure differential between the interior of the separator element and the interior of the sealed housing. The second housing also acts to gather separated oil after it passes through the separator shell and to direct it to the sump area in the sealed housing. The separator element may be oriented horizontally or vertically within the sealed housing, with minor modification, making it more versatile than previous separators. The outlet of the separator element is preferably in direct flow communication with the discharge opening in the sealed housing as through piping or other passageway defining structure. However, under some circumstances it is envisioned that the gas which passes through the outlet of the separator element can be allowed simply to "dump" into the sealed housing from where it will be forced out of the housing as pressure builds within the housing.

BRIEF DESCRIPTION OF THE DRAWING

FIG. 1 is a perspective view of a typical refrigeration installation in which the separator apparatus of the present invention is employed.

FIG. 2 is a partial cross section of one embodiment of the separator apparatus of the present invention as employed in FIG. 1.

FIG. 3 is a perspective view of a modified refrigeration installation employing the separator apparatus of the present invention.

FIGS. 5, 6, and 7 are cross-sectional views taken along lines 5—5, 6—6 and 7—7 of FIGS. 4 and 6, respectively, illustrating alternative gas discharge conduit structure between the outlet of the separator element and the opening in the sealed housing through which gas is discharged to the refrigeration installation.

FIG. 8 is a schematic view of a third refrigeration installation in which the separator element is vertically disposed and in which the refrigerant compressor is accommodated entirely within the sealed housing.

FIG. 9 is a bottom view of the separator element of FIG. 8.

FIG. 10 is a cross-sectional view of the separator element of the refrigeration installation of FIG. 8 taken along line 10—10 of FIG. 9.

FIGS. 11 and 12 are cross-sectional views taken along lines 11—11 and 12—12 of FIG. 10.

DESCRIPTION OF THE PREFERRED EMBODIMENT

Figure 5:
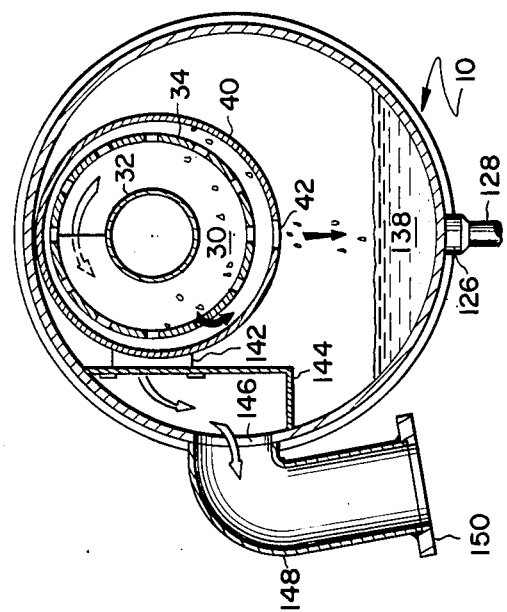

Referring to FIG. 1, it will be seen that separator housing 10 is disposed in refrigeration circuit 100 to receive the mixture of compressed refrigerant gas and atomized oil discharged by screw compressor 102.

Refrigerant gas at high pressure, after passing through separator housing 10, passes into conduit section 104 and is communicated to condenser 106. Condensed refrigerant exits condenser 106 and enters the conduit section illustrated generally at 108. The refrigerant is next metered through expansion device 110, passes through conduit section 112 and enters economizer 114. After passing through economizer 114 the refrigerant is directed into conduit section 116 and enters evaporator 118. Vaporized refrigerant gas is next directed out of evaporator 118 through conduit section 120 which is in flow communication with the suction port in the low pressure end 122 of screw compressor 102. Refrigerant gas entering the suction port of compressor 102 enters a pocket between the compressor rotors and is compressed therebetween as the pocket closes. A liquid such as oil is injected into the refrigerant within such a pocket for the purpose of increasing compressor efficiency and for the purpose of compressor lubrication. Compressed refrigerant gas, in which injected oil is entrained, is discharged from compressor 102 at the compressor's high pressure end indicated generally at 124. Also illustrated in FIG. 1 is drain fitting 126 and oil conduit 128 through which oil is directed back to compressor 102 from separator housing 10 for re-injection into the compressor.

Referring now to FIGS. 1 and 2 concurrently, the preferred embodiment of the separator apparatus and its interaction with screw compressor 102 will be understood. Separator housing 10 is a sealed housing, the exact geometry of which is not critical. In the embodiment of FIG. 2 separator housing 10 is generally cylindrical in nature and has, at a first end, a cap portion 12 sealingly engaged with a cylindrical portion 14 as by welding. Likewise, a base plate 16 is sealingly engaged with cylindrical portion 14 opposite the end of cylindrical portion 14 closed by cap portion 12. Base plate 16, in the embodiment of FIG. 2, defines an opening through which the high pressure end 124 of compressor 102, including the discharge port 130 of the compressor, extends. A flange such as flange 132 extending around high pressure end 124 of compressor 102 sealingly engages base plate 16. Flange 132 is bolted to base plate 16 utilizing bolts, not shown, and a gasket or seal, also not shown, disposed between base plate 16 and flange 132. The location and disposition of compressor 102 with respect to separator housing 10 is not critical and is subject only to certain requirements which will become apparent hereafter.

Disposed within separator housing 10, and at the heart of the invention herein disclosed is separator element 18. Separator element 18 is preferably a right circular cylinder. Inlet end 20 of separator element 18 defines inlet 22. Outlet end 24 of separator element 18 defines outlet 26. In the embodiment illustrated in FIG. 2 conduit 28 connects discharge port 130 of compressor 102 to inlet 22 of separator element 18 to provide for the direct communication of a mixture discharged by compressor 102 to separator element 18. It should be apparent that alternatively, discharge port 130 of compressor 102 might easily be fit directly into inlet 22 of separator element 18 in which case conduit 28 could be dispensed with.

Separator element 18 includes a helical ramp 30 which wraps around central column 32. Ramp 30 is attached at its outer edge to the interior surface of separator shell 34. Shell 34 of separator element 18 is permeable and forms the cylindrical wall of separator element 18. Permeable, as defined by WEBSTER'S NEW COLLEGIATE DICTIONARY, Copyright 1975 by G. C. Merriam Co., connotes a thing having pores or openings that permit liquids or gases to pass through. The exact nature of the permeability of shell 34, and the construction of shell 34 will depend upon the particular operating parameters of the system in which the separator element of the present invention is used. Wire mesh walls have proven satisfactory, but are less desirable from a cost standpoint. Circular apertures in shell 34 are preferred although longitudinal slots and slots running normal to the axis of the shell may be employed. The nature of shell 34 and the apertures therein will be considered further below.

Helical ramp 30, central column 32, and separator shell 34 all cooperate to define a helical passage between inlet 22 and outlet 26 within separator element 18. At least the majority of the interior edge of ramp 30 is attached to central column 32. Central column 32 includes deflector surface 36 for directing a mixture entering inlet 22 into the aforementioned helical passage. Column 32 stops short of extending the entire length of separator element 18 in order to provide a gas discharge area within element 18 adjacent outlet 26.

In the embodiment of FIG. 2, separator housing 10 defines a gas discharge opening 134 in its upper surface. Gas discharge conduit 136 provides a flow path for gas from which liquid has been separated out of outlet 26 to discharge opening 134 of housing 10. Also illustrated in FIG. 2 is drain fitting 126 and oil conduit 128 through which liquid accumulating in the sump portion 138 of separator housing 10 is drawn from the separator housing. Separator element 18 is disposed in the upper portion of separator housing 10 at an elevation above sump area 138 such that no contact occurs between liquid pooled in the sump area and separator element 18. The liquid within sump 138 of housing 10 may be allowed to drain continuously or the level of liquid therein may be otherwise controlled so that a constant liquid level is maintained within housing 10. Neither alternative is particularly advantageous as compared to the other so long as the liquid draining provision has essentially no affect on the pressure within separator housing 10.

In operation, a liquid-gas mixture entering separator element 18 is constrained to follow the helical passage between inlet 22 and outlet 26 and defined by helical ramp 30, central column 32 and shell 34. The mixture is immediately deflected by deflector surface 36 and is imparted a swirling motion upon entering the helical passage of separator element 18. Centrifugal forces resulting from the direction of the mixture through the helical passage cause the heavier liquid portion of the mixture to migrate outwardly from the axis of separator element 18 toward the interior surface of permeable shell 34. The outwardly migrating liquid either passes directly through the permeable shell without contact or impinges directly on the interior surface of the shell. Liquid passing through shell 34 without contact settles by force of gravity to sump area 138 of housing 10. Liquid impacting shell 34 drains by force of gravity or is moved axially by the force of the mixture proceeding through separator element 18 until an opening in shell 34 is encountered through which the liquid is able to pass.

Figure 4:
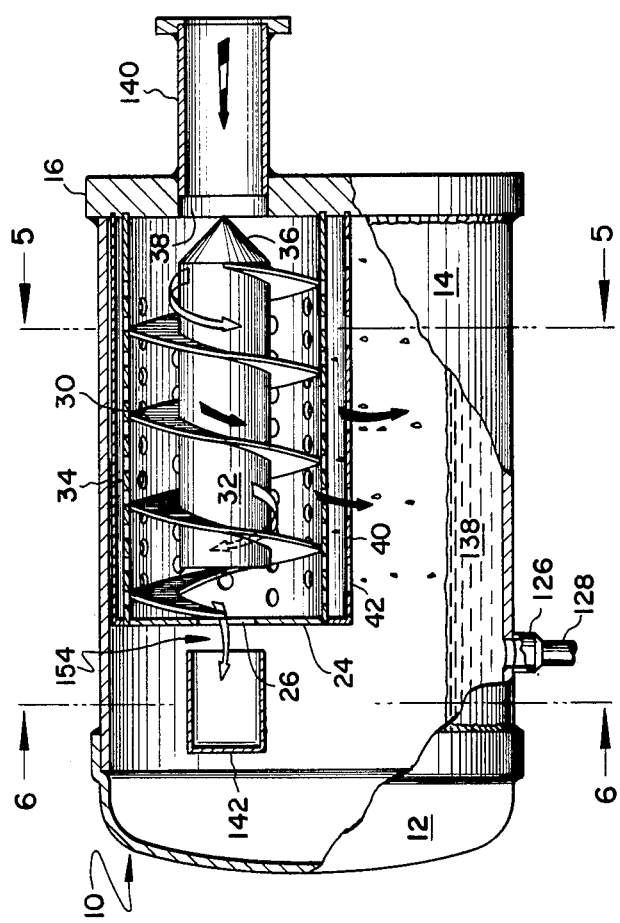
FIG. 4 is a partial cross section of the embodiment of the present invention as employed in the installation of FIG. 3 and illustrating the use of an optional second housing to enclose the separator element.

In the embodiment of FIGS. 3, 4, 5, 6, and 7, in which elements identical to corresponding elements of the embodiment of FIGS. 1 and 2 are identically numbered, separator housing 10 is physically displaced from the high pressure end 124 of compressor 102. Conduit section 140 is attached at one end to high pressure end 124 of compressor 102 and is in communication with the discharge port therein. At its opposite end, conduit section 140 is sealingly disposed within opening 38 in base plate 16 of separator housing 10. In the embodiment of FIG. 4, separator shell 34 is mounted directly onto base plate 16 and central column 32 is in direct alignment and is coaxial with hole 38 in base plate 16. Once again, the mixture discharged from compressor 102 is directly communicated to the inlet of separator element 18. In the case of this embodiment, however, the inlet defined by separator element 18 comprises the entire open end of separator shell 34. The area through which a mixture discharged by compressor 102 is constrained to pass is, however, defined by conduit 140 and hole 38 in base plate 16. The net effect of this configuration does not differ from the embodiment of FIGS. 1 and 2 in this respect.

The embodiment of FIGS. 3 through 7 differs in two other aspects from the embodiment of FIGS. 1 and 2. First, in the embodiment of FIGS. 3 through 7, gas from which liquid has been separated exiting outlet 26 of separator element 18 is directed into a scoop-like structure 142. Scoop-like structure 142 directs the discharged gas into header 144 through which the gas is directed to opening 146 in housing 10 for ultimate discharge into conduit section 148. Conduit section 148 includes flange 150 which attaches to a cooperating flange on conduit section 152. Conduit section 152 is in flow communication with to condenser 106. It will be noted that scoop-like structure 142 is spaced slightly apart from outlet end 24 of separator element 18. Gap 154 facilitates the balancing of pressure between separator element 18 and the interior of housing 10. The positioning of scoop-like structure 142 over outlet 26 facilitates the direction of gas out of housing 10 while preventing the reentrainment of previously separated oil which can occur if the gas is simply allowed to dump into the interior of housing 10 prior to exiting the housing.

The second aspect in which the embodiment of FIGS. 3 through 7 differs relates to the employment of second housing 40 within separator housing 10. Second housing 40 is attached to base plate 16 and separator shell 34 and cooperates therewith to define an enclosed space around the periphery of separator shell 34. Second housing 40 includes drain apertures 42 in its lower portion which are disposed immediately above sump area 138 in separator housing 10. The employment of second housing 40 is optional. The advantage in employing second housing 40 resides in the resulting ability to more precisely control the differential pressure between the interior of separator element 18 and the interior of separator housing 10. Control over this pressure is more easily accomplished by virtue of the ability to vary the size of apertures 42 in second housing 40 without affecting the basic operation of separator element 18. The use of second housing 40, of course, results in more weight and added expense for material in constructing the separator. Second housing 40, in addition to affording an opportunity for differential pressure control gathers and directs separated liquid which has passed through the permeable wall of separator shell 34 and acts to deposit such liquid in sump portion 138 of housing 10.

The embodiment of FIGS. 8, 9, 10, 11 and 12 is representative of a vertical separator installation. Additionally, in this embodiment, the compressor is mounted entirely within the separator housing. As aforementioned, the disposition of the compressor with respect to the separator housing is inconsequential so long as the compressor discharge port communicates directly with the inlet of the separator element. In FIG. 8 compressor 200 is mounted in sealed housing 202 and includes a high pressure end 204 which communicates with separator element 250 through conduit section 206. The sump area in housing 202 is indicated generally at 208.

Separator element 250, like its counterpart in the embodiments previously described, includes an inlet end 252 and an outlet end 254 connected by a permeable cylindrical separator shell 256. Second housing 258 is disposed around separator element 250 and includes a ramplike directing plate 260 which cooperates with conduit section 206 to deliver the mixture discharged by compressor 202 to inlet 262 of separator element 250. It should be apparent that conduit section 206 could easily be configured to discharge directly into inlet 262 of separator element 250. For ease in fabrication, however, the use of ramplike plate 260 has proven convenient in a vertical installation.

While second housing 40 of the embodiment of FIG. 4 is illustrated attached to base plate 16 of separator housing 10, second housing 258 of the embodiment of FIG. 10 includes its own base plate 264. Base plate 264 lends structural integrity to the embodiment of FIG. 10 which, as illustrated in FIG. 8, is mounted in a suspended fashion within housing 202. A plurality of drain apertures 266 are defined by base plate 264 as well as a central aperture 268 through which hollow central column 270 extends. Disposed in the upper portion of column 270 is an opening 272 through which the interior of column 270 communicates with the helical passage defined in the interior of separator element 250. Column 270 is a closed column with the closure being effected at a point between lower lip 274 of opening 272 and lower column end 276. Such closure prevents gas entering the interior of central column 270 from being dumped downwardly into the interior of housing 202 and impinging directly on liquid contained in sump area 208. Gas from which liquid has been separated entering opening 272 in central column 270 passes through outlet end 254 of separator element 256 and into conduit section 278 from where it is directed out of housing 202 through opening 210.

It will be noted that in the embodiment of FIG. 10 separator shell 256 defines axially running apertures 280 as opposed to the circular apertures in the separator element of the previously described embodiments. Axially running apertures 280 ensure that any liquid disentrained from the mixture discharged by compressor 200 within separator element 250 will encounter an aperture through which to pass as it moves upward or downward along the outer edge of helical ramp 282. A second plurality of drain apertures 284 is provided in second housing 258 through which liquid is directed for drainage purposes after passing through axially running apertures 280 in separator shell 256.

In determining the exact configuration of the separator for a particular application several parameters are to be considered. Initially, a decision is made as to whether the separator element will be horizontally or vertically disposed. The capacity of the sump of the sealed housing is determined based upon the size of the refrigeration system. A sump capacity of one gallon of oil for every twenty tons of refrigeration capacity has proven satisfactory in one screw compressor refrigeration application. The length, inside and outside diameter and pitch of the helical ramp, as well as the velocity of the mixture entering the inlet of the separator element predetermine the size of the smallest droplet of liquid which will be captured in the separator element. All of these factors influence the size of a droplet capable of migrating radially outward from a position adjacent the central column within the separator element to the interior wall of the separator shell when the length of the element and the affects of centrifugal force and drag operating on a droplet are considered. Clearly, any one of a number of constraints ranging from permissible separator element length to a predetermined minimum droplet size desired to be captured will affect the dimensions and configuration of a particular installation.

A pressure balance must be achieved between the interior of the separator element and the interior of the housing in which it is contained in order to facilitate the driving of separated liquid droplets through the permeable wall of the separator shell. Where an optional second housing surrounds the separator shell, such as second housing 40 of the embodiment of FIG. 4 and second housing 258 of the embodiment of FIG. 10, the size of the drain apertures, 42 and 266 respectively, can conveniently be varied to achieve such pressure balancing. Where no second housing is employed, as in the embodiment of FIG. 2, pressure balancing is necessarily achieved by increasing or decreasing the permeability of the separator shell. In addition to balancing the pressure between the interior of the separator element and the interior of the sealed housing, limiting of the overall pressure drop in the gas passing through the separator element is a paramount objective. Such pressure drop is calculated utilizing methods well known in the art and pressure drops of less than 4 psi have been accomplished.

It is also to be noted that although the use of discharge conduit means, such as conduit sections 136 and 278 in the embodiments of FIGS. 2 and 10 respectively, or scoop-like structure 142 and header 144 in the embodiment of FIG. 4, is preferred, the use of such conduit means may be entirely dispensed with in some applications. In such cases, gas from which liquid has been separated exits the outlet in the outlet end of the separator element and dumps directly into the interior of the sealed separator housing. The gas is then discharged through the exit opening in the sealed housing as pressure builds within the housing. While the elimination of the discharge conduit means facilitates balancing the pressure between the interior of the separator element and the interior of the sealed housing, the dumping of gas directly into the sealed housing, which includes a sump area, will cause some oil to be re-entrained within the gas. The decision of whether or not to employ discharge conduit means must be made on a case-by-case basis.

As should be apparent to those familiar with the art, the exact configuration of the present invention will differ from one application to another. Therefore, it will be appreciated that the present invention is not to be narrowly construed but instead should be construed and limited only by the bounds set forth in the following claims.

What is claimed is:

1. Apparatus for separating oil from the mixture of oil and compressed refrigerant gas discharged by an oil-injected compressor in a refrigeration circuit comprising:

sealed housing means having a discharge opening and defining an oil sump, said housing means for receiving a mixture of compressed gas into which oil has been injected;

a cylindrical, permeable separator shell having an inlet end and an outlet end, said shell being mounted interior of said sealed housing means so that said mixture of oil and gas received by said sealed housing means is communicated directly into the inlet end of said shell and said shell being mounted at a height above said oil sump which precludes contact of said shell with oil in said sump, the permeability of said shell being selected to maintain a predetermined pressure differential between the interior of said shell and the interior of said sealed housing means to facilitate the driving of oil through said permeable shell;

means, disposed interior of said shell and including a column coaxial with said shell, for defining a single uninterrupted helical passage having a single helical orientation interior of said separator shell between said inlet end and said outlet end, said column extending less than the entire length of said shell and cooperating with said shell to define an unobstructed discharge area at said outlet end of said shell, said discharge area being in flow communication with said discharge opening of said sealed housing means, whereby in operation a mixture entering said shell is imparted a swirling motion in a single helical direction so that the gas in the mixture travels through said shell in a single swirl and in a single flow direction to minimize the pressure drop in the gas while sufficient centrifugal force is imparted the oil to cause the migration of oil droplets of a size greter than a predetermined size radially outward to and through the permeable wall of said shell within the length of said shell.

2. The separating apparatus according to claim 1 wherein said means for defining a helical passage interior of said separator shell comprises said coaxial column and a helical ramp wrapped around said coaxial column, the axis of said helical ramp being coaxial with both the axes of said column and said separator shell.

3. The separating apparatus according to claim 2 wherein said column includes means for directing said mixture of oil and gas directed into said inlet end of said shell into said helical passage defined interior of said shell by said column and said ramp.

4. The separating apparatus according to claim 3 further comprising means for communicating oil from said sump of said sealed housing back to said compressor for reinjection thereinto.

* * * * *